United States Patent
Koeppler et al.

(10) Patent No.: US 7,637,126 B2
(45) Date of Patent: Dec. 29, 2009

(54) METHOD FOR THE PRODUCTION OF LASER-ACTIVE QUARTZ GLASS AND USE THEREOF

(75) Inventors: Rainer Koeppler, Seligenstadt (DE); Bodo Kuehn, Gelnhausen (DE); Waltraud Werdecker, Hanau (DE); Ulrich Kirst, Mainz (DE); Walter Lehmann, Leipzig (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 696 days.

(21) Appl. No.: 10/582,117

(22) PCT Filed: Nov. 30, 2004

(86) PCT No.: PCT/EP2004/013544

§ 371 (c)(1),
(2), (4) Date: Jun. 8, 2006

(87) PCT Pub. No.: WO2005/054139

PCT Pub. Date: Jun. 16, 2005

(65) Prior Publication Data

US 2007/0145332 A1    Jun. 28, 2007

(30) Foreign Application Priority Data

Dec. 8, 2003  (DE) .................................. 103 57 580
Feb. 6, 2004  (DE) ........................ 10 2004 006 017

(51) Int. Cl.
C03B 37/075    (2006.01)

(52) U.S. Cl. ................. 65/390; 65/384; 372/6; 385/123

(58) Field of Classification Search ............... 501/50, 501/53–55
See application file for complete search history.

(56) References Cited

U.S. PATENT DOCUMENTS 5,643,347 A    7/1997  Werdecker et al.
5,979,186 A *  11/1999 Koppler et al. .............. 65/21.1
6,129,899 A *  10/2000 Katsuro et al. .............. 423/338
6,380,110 B1 *  4/2002  Werdecker et al. ............ 501/54
6,672,107 B2 *  1/2004  Werdecker et al. .......... 65/17.4
6,684,664 B2    2/2004  Werdecker et al.
6,690,868 B2 *  2/2004  Anderson et al. ........... 385/123
6,849,242 B1 *  2/2005  Koeppler et al. ............ 423/338
6,966,201 B2 * 11/2005  DiGiovanni et al. ......... 65/395
2002/0134108 A1 * 9/2002  Werdecker et al. .......... 65/17.6
2002/0136515 A1 * 9/2002  Schaper et al. ............. 385/123
2003/0005724 A1 * 1/2003  Sugiyama et al. ........... 65/17.2
2003/0026565 A1 * 2/2003  Anderson et al. .......... 385/123
2003/0118315 A1 * 6/2003  Hewak et al. ............... 385/142

FOREIGN PATENT DOCUMENTS

DE       197 29 505 A1    1/1999
EP       0 692 524 A1     1/1996
EP       1 148 035 A2    10/2001
WO       WO 01/46079 A1   6/2001

\* cited by examiner

Primary Examiner—Steven P Griffin
Assistant Examiner—Jodi Cohen
(74) Attorney, Agent, or Firm—Tiajoloff and Kelly LLP

(57) ABSTRACT

The invention relates to a method for the economic production of a blank for a component made from laser-active quartz glass in any form or dimension. The method comprises the following method steps: a) preparation of a dispersion with a solids content of at least 40 wt. %, comprising $SiO_2$ nanopowder and doping agents, including a cation of the rare earth metals and transition metals in a fluid, b) granulation by agitation of the dispersion, with removal of moisture to form a doped $SiO_2$ granulate of spherical porous granular particles with a moisture content of less than 35 wt. % and a density of at least 0.95 g/cm$^3$, c) drying and purification of the $SiO_2$ granulate, by heating to a temperature of at least 1000° C. to form doped porous $SiO_2$ grains with an OH content of less than 10 ppm and d) sintering or fusing the doped $SiO_2$ grains in a reducing atmosphere to give the blank made from doped quartz glass.

18 Claims, No Drawings

METHOD FOR THE PRODUCTION OF LASER-ACTIVE QUARTZ GLASS AND USE THEREOF

The present invention relates to a method for producing laser active quartz glass.

Laser active quartz glass is e.g. used for producing fiber amplifiers or fiber lasers, edge filters or frequency converters. Pumped fiber lasers are inter alia used for material processing and in medical engineering.

Laser active quartz glass contains dopants which effect an amplification of laser radiation in the host material quartz glass. As a rule, these are rare earth cations (lanthanides), but also cations of the so-called transition metals. Of importance are here an amplification power that is as high as possible and a low attenuation of the laser radiation to be amplified.

The fundamental tasks arising in this connection are to ensure a homogeneous distribution of the dopants in the quartz glass and to prevent devitrification, which may particularly arise in high dopant concentrations. In fiber lasers for high-performance applications, which are e.g. known under the name "large mode area fiber laser", special emphasis is laid on the provision of a laser active volume that is as large as possible.

Optical fibers are normally drawn from preforms which have a core portion which consists of the laser active material and is enveloped by a cladding glass portion. Since the fibers must exhibit a sufficiently low attenuation, CVD methods or sol-gel methods are usually employed for producing the preforms, the methods ensuring high purity. At the moment, high-performance laser fibers based on quartz glass are predominantly produced according to the so-called MCVD (modified chemical vapor deposition) method. Said method, however, is long-winded and expensive, and in the meantime it reached its limits with respect to the feasible fiber dimensions. Apart from this, many laser-active dopants cannot be deposited via the gas phase (by CVD methods). The attempt is made to solve this problem by subsequent doping, which however constitutes an additional process step on the one hand and leads to deficiencies in the material characteristics on the other hand, these deficiencies being due to physical restrictions in diffusion processes. The dopant gradients should here substantially be mentioned.

Production methods based on the sol-gel process partly require long process times and do often not yield the necessary material qualities.

As a rule, the necessary high purity cannot be achieved by means of melting methods.

It is therefore the object of the present invention to provide a method for producing laser-active high-quality quartz glass which is economic and makes it possible to provide a laser active volume of doped quartz glass in almost any form and dimension.

According to the invention said object is achieved through a method comprising the following steps:

a) providing a dispersion with a solids content of at least 40% by wt. which contains $SiO_2$ nanopowder and dopants, including a cation of the rare earth metals and transition metals in a liquid,
b) granulation by moving the dispersion with withdrawal of moisture until the formation of a doped $SiO_2$ granulate of spherical porous granulate grains having a moisture content of less than 35% by wt. and a density of at least 0.95. g/cm$^3$,
c) drying and purifying the $SiO_2$ granulate by heating to a temperature of at least 1000° C. with formation of doped porous $SiO_2$ granules having an OH content of less than 10 ppm, and
d) sintering or melting the doped $SiO_2$ granules in a reducing atmosphere with formation of the blank of doped quartz glass.

The blank for a component of laser active quartz glass is produced according to the invention neither through a CVD nor a melting or sol-gel method, but via a special "powder route", namely using a high-purity, homogeneously doped $SiO_2$ granulate. It has been found that the demands made on the purity of the start materials can be satisfied via this "granulate-powder route" on the one hand, and that the necessary homogeneous distribution of the dopant or the dopants in the quartz glass can be ensured on the other hand.

It has surprisingly been found that the fibers produced according to the granulate-powder route have substantially higher absorption rates and thus better amplification properties than the fibers made from other start materials and according to other methods. It seems that the "granulate history" of the manufacturing process or invisible "grain structures" of the material that seem to be inscribed into the start material in a formative manner and lead to a considerably-higher efficiency of the laser light amplification due to scattering effects (this can be detected in so-called "fiber laser slope tests") play an essential role. Especially these scattering effects that lead to a higher optical attenuation seem to disqualify such fibers for use in telecommunication engineering.

According to the invention an $SiO_2$ granulate is first produced that is doped with the dopant in a homogenous way. A method for producing such an $SiO_2$ granulate is described in DE 197 29 505 A1. An essential modification of the known method for granulate production is that the dispersion according to the invention contains at least one dopant comprising a cation of the rare earth metals and the transition metals that effect the laser activity of the quartz glass. Moreover, further dopants may be provided for adjusting the viscosity and the refractive index of the quartz glass, for which one or several components selected from the group consisting of aluminum, phosphorus and boron have primarily been used.

The $SiO_2$ powder used for making the dispersion is present as so-called nanopowder. This contains powder particles having a particle size below 100 nm, which can e.g. by obtained by pyrolysis of $SiO_2$ start compounds, by precipitation reactions or by grinding vitrified $SiO_2$ granules. Said finely dispersed nanopowder permits the necessary homogenous distribution of the dopants in the quartz glass.

According to the invention the dopants are homogeneously distributed in the dispersion. The dopants are also present as finely divided powder or in the form of a liquid.

In the case of the "granulate powder route" a porous intermediate product is obtained in the form of porous $SiO_2$ granulate or porous $SiO_2$ granules (method steps b) and c)). In the further processing of said material there is the risk that closed, gas-filled cavities are formed that cannot be removed from the highly viscous quartz glass or can only be removed very slowly by a subsequent fusion, and lead to bubbles in the quartz glass. These, however, are hardly acceptable in a laser active component.

Therefore, according to method step b) granulation is carried out such that the evolving spherical porous granulate grains have a density of at least 0.95 g/cm$^3$. This high density is accompanied by a low pore content of the granulate grains, which reduces the risk of bubble formation.

Granulation is achieved in that moisture is removed from the dispersion under continuous movement until it forms a crumbly, still porous, mass—a granulate. The movement is generally carried out by stirring, as described in DE 197 29 505 A1. It is important that the dispersion will only disintegrate into a crumbly mass when it shows a high solids contents. The liquid phase of the dispersion should thus be maintained as long a possible, which can be ensured in a thixotropic dispersion by movement with high energy input. A granulation method suited therefor is roll granulation in a pan granulator. However, it is also possible to use other granulation techniques such as spray granulation, centrifugal atomization or fluidized-bed granulation in an advantageous way to prepare the granulate. Other granulating methods carried out by using a granulating crusher, by performing compaction, roll pressing, briquetting or extrusion are however also possible and can support the manufacture of customized components of doped quartz glass.

What is essential is that the $SiO_2$ granulate obtained consists of porous $SiO_2$ granulate grains that have a spherical shape, and whose moisture content is less than 35% by wt. and the density thereof is at least $0.75 \text{ g/cm}^3$. It is only through the high density of the $SiO_2$ granulate and the high solids content that low shrinkage and bubble-free fusion or sintering are ensured.

The resulting porous granulate is dried and purified in a further method step by being heated to a temperature of at least 1000° C. with formation of porous $SiO_2$ granules. In this process the granulate is thermally densified while maintaining the porosity.

As for the formation of bubbles during subsequent vitrification and an impairment of the optical properties of the quartz glass by absorption, it is important that the $SiO_2$ granules have an OH content of less than 10 wt ppm. On account of its residual porosity the $SiO_2$ granulate can additionally be provided with dopants before, during or after method step c), i.e. drying and purification. This doping process can be carried out through the gas phase or the liquid phase.

It is also important that the dopants are present in the $SiO_2$ granules in a homogenously distributed form and are firmly bound therein. To this end dopants that can form volatile compounds at an elevated temperature must normally be converted into solid oxides, which is preferably done in the course of method steps a) to c).

The resulting $SiO_2$ granules are homogeneously doped with the laser active dopant and then sintered or molten with formation of the quartz glass blank according to method step d). It has been found that it is possible to obtain a bubble-free, homogeneously doped quartz glass when the $SiO_2$ granulate used (and thus also the resulting $SiO_2$ granules) have a high density and, at the same time, a low OH content of less than 10 wt ppm and when sintering or melting is carried out in a reducing atmosphere.

The feature mentioned in method step d), according to which sintering or melting of the doped $SiO_2$ granules is carried out in a reducing atmosphere, also shows a bubble-reducing action. The reducing atmosphere can reduce the formation of oxygen-containing gas bubbles in the quartz glass of the $SiO_2$ blank or the formation of bubbles with oxygen-containing gas filling. A reducing atmosphere is for instance accomplished by using crucible or furnace parts of graphite or carbon.

The method of the invention constitutes a flexible and economic manufacturing method which ensures a customized product processing due to the "granulate-powder route" in a modular way on the basis of method steps a) to d), and the most different dopant concentrations can here be obtained.

As for a high density of the $SiO_2$ granulate and an accompanying homogeneous dopant distribution and a low bubble density of the quartz glass to be produced, a procedure is preferred in which an initial solids content of at least 50% by wt., preferably at least 60% by wt., is set in the dispersion.

It is also of advantage to a low bubble density if the $SiO_2$ granulate obtained according to method step b) has a BET surface area ranging from $40 \text{ m}^2/\text{g}$ to $70 \text{ m}^2/\text{g}$. Preferably, the BET surface area according to method step b) is at least $50 \text{ m}^2/\text{g}$ in the $SiO_2$ granulate. This achieves a reduced formation of bubbles during sintering or melting of the $SiO_2$ granulate.

As for an advantageous sintering or melting method, it has turned out to be advantageous when the spherical porous granulate grains have a grain size of less than 500 μm.

A particularly efficient and rapid drying of the porous $SiO_2$ granulate grains is achieved when the $SiO_2$ granulate is dried and purified in a chlorine-containing atmosphere. It has turned out to be particularly advantageous when the $SiO_2$ granulate is dried and purified at a temperature of at least 950° C.

Advantageously, drying and purifying of the porous granulate is carried out in an oxygen-containing atmosphere. This effects a fixation of such dopants that during heating to elevated temperatures may form volatile compounds.

It has turned out to be of further advantage when the porous $SiO_2$ granules obtained according to method step c) have an OH content of less than 1 wt ppm.

The low OH content has an advantageous effect on both bubble formation and optical attenuation of the quartz glass at the light wavelengths influenced by the OH absorption.

As for a reduced formation of bubbles, it has also turned out to be advantageous when the porous $SiO_2$ granules obtained according to method step c) have a BET surface area of less than $20 \text{ m}^2/\text{g}$.

A procedure is particularly preferred in which sintering or melting of the $SiO_2$ granules according to method step d) includes gas pressure sintering. In gas pressure sintering, the $SiO_2$ granules to be sintered are heated under increased pressure and molten in this process. Overpressure reduces the formation of bubbles.

A method variant of the gas pressure sintering process has turned out to be particularly advantageous that comprises the following method steps:

aa) heating the $SiO_2$ granules to a melting temperature of at least 1600° C. while applying and maintaining a negative pressure;

bb) holding at the melting temperature at an overpressure ranging from 5 bar to 15 bar for a melting period of at least 30 min with formation of the quartz glass blank;

cc) cooling the quartz glass blank.

With this variant of the method, it is especially possible to produce large molded parts in an optically perfect quality.

It has turned out to be particularly advantageous when cooling according to method step cc) is carried out while maintaining an overpressure. Maintaining the overpressure during cooling prevents the formation and growth of bubbles in the still softened quartz glass.

A method modification has turned out to be particularly advantageous in which the $SiO_2$ granules are thermally densified prior to method step d). The pre-densification of the $SiO_2$ granules also helps to reduce the formation of bubbles during the melting or sintering phase.

It has turned out to be useful when the quartz glass blank is annealed at a temperature of at least 1120° C. for a retention period of at least 40 h. This reduces thermal stresses causing birefringence.

In a particularly preferred variant of the method, the $SiO_2$ granules according to method step d) are molten in a mold. Due to the high density of the $SiO_2$ granules and the accompanying low shrinkage of the molded body sintered therefrom, said body essentially shows the dimensions predetermined by the mold. Reworking can thus be avoided and material losses can be reduced, which improves the economy of the method even more.

Preferably, the $SiO_2$ blank according to method step d) is three-dimensionally homogenized. Homogenization is carried out by thorough mixing of the $SiO_2$ blank in several directions.

This accomplishes the absence of striae and a refractive index distribution that is homogeneous in three dimensions.

As an alternative, it has also turned out to be advantageous when a bulk body with a radially inhomogeneous refractive index distribution is formed from $SiO_2$ granules of different refractive index and when said bulk body is sintered or molten into the $SiO_2$ blank.

With a corresponding arrangement of $SiO_2$ granules of a different refractive index in a bulk body, any desired refractive index distributions can be realized in the sintered quartz glass blank. It is also possible to realize harmonic transitions with adapted mechanical properties, e.g. thermal expansion coefficients.

The method of the invention is particularly suited for producing $SiO_2$ blanks which are used as a core material for fiber lasers, as optical filters, or as cladding tubes for lasers. Such cladding tubes for lasers are used as cooling tubes for introducing a coolant. The fiber lasers are laterally pumped or end-pumped fiber lasers.

The invention will now be described in more detail with reference to embodiments.

1. EXAMPLE

Yb-doped Quartz Glass

A rod having a diameter of 6 mm is made from laser-active quartz glass which is doped with 0.7 mol % $Yb_2O_3$ and with 5.0 mol % $Al_2O_3$.

To this end an aqueous dispersion is made from water and amorphous, nanoscale pyrogenic $SiO_2$ particles produced by flame hydrolysis of $SiCl_4$ having a specific BET surface area of 50 $m^2/g$, and the dispersion is homogenized. Water-soluble hydrate compounds are introduced into the homogeneous, dispersion as start components for the dopants. 1000 g $SiO_2$ and dopants in the following amounts are stirred into 1500 g water:

| | |
|---|---|
| $YbCl_3 \times 6H_2$: | 87 g |
| $AlCl_3 \times 6H_2O$: | 387 g |

The granulate is produced by means of a standard wet granulation method using an Eirich mixer. To this end moisture is removed from the dispersion by passing heated air thereover and under continuous stirring until the dispersion disintegrates forming a crumbly mass consisting of spherical, porous, homogeneously doped $SiO_2$ granulate grains.

The $SiO_2$ granulate grains are distinguished by a low moisture content of 28% by wt. and by a density of 0.75 $g/cm^3$.

They are subsequently purified and dried by heating in a continuous furnace at a temperature of about 1100° C. in a chlorine-containing atmosphere and are thermally slightly pre-densified at the same time. Purification by means of chlorine is here particularly efficient because the surface of the $SiO_2$ particles is accessible via the pore channels for the purification gas and the gaseous impurities can be removed easily.

The $SiO_2$ granules-obtained after this pre-treatment are distinguished by an OH content of less than 1 wt ppm, a specific BET surface area of 34 $m^2/g$ and an apparent density after tamping of 0.95 $g/cm^3$. The mean grain diameter is about 420 μm, the fraction with grain sizes above 500 μm being removed prior to sintering. The total content of the impurities of Li, Na, K, Mg, Ca, Fe, Cu and Mn is less than 200 wt ppb.

The doped porous $SiO_2$ granules of amorphous nanoscale $SiO_2$ particles produced in this way are subsequently put into a graphite mold and vitrified by gas pressure sintering at a temperature of 1600° C. The mold is first heated to the sintering temperature of 1600° C. while maintaining a negative pressure. After the sintering temperature has been reached an overpressure of 5 bar is set and the mold is kept at this temperature for about 30 min. During subsequent cooling to room temperature the overpressure is further maintained up to a temperature of 400° C.

The Yb-doped quartz glass block obtained in this way is transparent and of excellent optical quality. The quartz glass is suited as a core glass for an optically pumped fiber laser. Core rods with a diameter of up to 15 mm are taken from the block material by core drilling. The hollow cylinders produced in this way can be used as laser-active cooling tubes in lasers.

2. EXAMPLE

Nd-doped Quartz Glass

A rod having a diameter of 10 mm and a length of 1 m is made from laser-active quartz glass which is doped with 1300 ppm $Nd_2O_3$ and 0.5 mol % $Al_2O_3$.

To this end an aqueous dispersion with an initial solids content of 50% by wt. is made from water and from amorphous nanoscale $SiO_2$ particles produced in a sol-gel precipitation reaction and the dispersion is homogenized. Water-soluble hydrate compounds are introduced into the homogeneous dispersion as start components for the dopants. 40.0 g $AlCl_3 \times 6H_2O$ and 2.8 g $NdCl_3 \times 6H_2O$ are stirred into the dispersion per kg $SiO_2$.

The granulate is prepared as described with reference to Example 1. Hence, the same properties of the resulting $SiO_2$ granulate grains are obtained.

The doped granulate is subsequently purified and dried by heating in a continuous furnace at a temperature of about 1250° C. in a chlorine- and oxygen-containing atmosphere and it is thermally slightly pre-densified at the same time. The $SiO_2$ granules obtained after this pretreatment are. distinguished by an OH content of less than 1 wt ppm and by a specific BET surface area of 18 $m^2/g$.

The grain fraction with grain sizes above 500 μm is removed, and the remaining granules are densely sintered by being heated to a temperature of about 1450° C. for a short period of time. The dense $SiO_2$ granules obtained in this way are distinguished by an OH content of less than 1 wt ppm. The total content of impurities of Li, Na, K, Mg, Ca, Fe, Cu and Mn is less than 200 wt ppb.

The doped porous $SiO_2$ granules produced in this way are subsequently put into a graphite mold and vitrified at a temperature of 1600° C. by gas pressure sintering, as has been described above with reference to Example 1.

The resulting Nd-doped quartz glass block is transparent and of excellent optical quality and is suited or use as a core material for a fiber laser or as an optical filter. Tubes that are used as laser active cooling tubes in lasers are made from the block material by core drilling.

The invention claimed is:

1. A method for producing a blank for a component of laser active quartz glass, said method comprising:
   a) providing a dispersion with a solids content of at least 40% by wt. which contains $SiO_2$ nanopowder and dopants, including a cation of one or more rare earth metals or transition metals in a liquid,
   b) granulation by moving the dispersion with withdrawal of moisture until a doped $SiO_2$ granulate of spherical porous granulate grains having a moisture content of less than 35% by wt. and a density of at least 0.95 g/cm³ is formed,
   c) drying and purifying the $SiO_2$ granulate by heating said $SiO_2$ granulate to a temperature of at least 1000° C. so as to form doped porous $SiO_2$ granules having an OH content of less than 10 ppm, and
   d) sintering the doped $SiO_2$ granules in a reducing atmosphere so as to form the blank of doped quartz glass, wherein said sintering includes a gas pressure sintering, which comprises the following steps:
      aa) heating the $SiO_2$ granules to a melting temperature of at least 1600° C. while applying and maintaining a negative pressure;
      bb) holding the $SiO_2$ granules at the melting temperature at an overpressure ranging from 5 bar to 15 bar for a melting period of at least 30 min so as to form the quartz glass blank;
      cc) cooling the quartz glass blank while maintaining said overpressure.

2. The method according to claim 1 wherein an initial solids content of at least 50% by wt. is set in the dispersion.

3. The method according to claim 1, wherein the $SiO_2$ granulate obtained according to step b) has a BET surface area ranging from 40 m²/g to 70 ²/g.

4. The method according to claim 3, wherein the $SiO_2$ granulate obtained according to step b) has a BET surface area of at least 50 m²/g.

5. The method according to claim 1, wherein the spherical porous granulate grains have a grain size of less than 500 μm.

6. The method according to claim 1, wherein the $SiO_2$ granulate is dried and purified in a chlorine-containing atmosphere.

7. The method according to claim 1, wherein the $SiO_2$ granulate is dried and purified at a temperature of at least 1050° C.

8. The method according to claim 1, wherein the drying and purifying of the porous granulate is performed in an oxygen-containing atmosphere.

9. The method according to claim 1, wherein the porous $SiO_2$ granules obtained according to step c) have an OH content of less than one ppm.

10. The method according to claim 1, wherein the porous $SiO_2$ granules obtained according to step c) have a BET surface area of less than 20 m²/g.

11. The method according to claim 1, wherein the $SiO_2$ granules are thermally densified prior to step d).

12. The method according to claim 1, wherein the quartz glass blank is annealed at a temperature of at least 1120° C. for a retention period of at least 40 hours h.

13. The method according to claim 1, wherein the $SiO_2$ granules according to step d) are molten in a mold.

14. The method according to claim 1, wherein the $SiO_2$ blank according to step d) is three-dimensionally homogenized.

15. The method according to claim 1, wherein bulk body with a radially inhomogeneous refractive index distribution is formed from $SiO_2$ granules of different refractive index, and the bulk body is sintered or molten to obtain the $SiO_2$ blank.

16. A method of transmitting laser light, said method comprising:
   producing a blank for a component of laser active quartz glass, said producing comprising:
   a) providing a dispersion with a solids content of at least 40% by wt. which contains $SiO_2$ nanopowder and dopants, including a cation of one or more rare earth metals or transition metals in a liquid,
   b) granulation by moving the dispersion with withdrawal of moisture until a doped $SiO_2$ granulate of spherical porous granulate grains having a moisture content of less than 35% by wt. and a density of at least 0.95 g/cm³ is formed,
   c) drying and purifying the $SiO_2$ granulate by heating said $SiO_2$ granulate to a temperature of at least 1000° C. so as to form doped porous $SiO_2$ granules having an OH content of less than 10 ppm, and
   d) sintering the doped $SiO_2$ granules in a reducing atmosphere so as to form the blank of doped quartz glass, wherein said sintering includes a gas pressure sintering, which comprises the following steps:
      aa) heating the $SiO_2$ granules to a melting temperature of at least 1600° C. while applying and maintaining a negative pressure;
      bb) holding the $SiO_2$ granules at the melting temperature at an overpressure ranging from 5 bar to 15 bar for a melting period of at least 30 min so as to form the quartz glass blank;
      cc) cooling the quartz glass blank while maintaining said overpressure;
   and incorporating said blank into a core material for a fiber and transmitting said laser light through said fiber.

17. A method of transmitting laser light, said method comprising:
   producing a blank for a component of laser active quartz glass, said producing comprising:
   a) providing a dispersion with a solids content of at least 40% by wt. which contains $SiO_2$ nanopowder and dopants, including a cation of one or more rare earth metals or transition metals in a liquid,
   b) granulation by moving the dispersion with withdrawal of moisture until a doped $SiO_2$ granulate of spherical porous granulate grains having a moisture content of less than 35% by wt. and a density of at least 0.95 g/cm³ is formed,
   c) drying and purifying the $SiO_2$ granulate by heating said $SiO_2$ granulate to a temperature of at least 1000° C. so as to form doped porous $SiO_2$ granules having an OH content of less than 10 ppm, and
   d) sintering the doped $SiO_2$ granules in a reducing atmosphere so as to form the blank of doped quartz glass, wherein said sintering includes a gas pressure sintering, which comprises the following steps:
      aa) heating the $SiO_2$ granules to a melting temperature of at least 1600° C. while applying and maintaining a negative pressure;
      bb) holding the $SiO_2$ granules at the melting temperature at an overpressure ranging from 5 bar to 15 bar for a melting period of at least 30 min so as to form the quartz glass blank;
      cc) cooling the quartz glass blank while maintaining said overpressure; and incorporating said blank into an optical filter; and transmitting said laser light through said optical filter.

18. A method of transmitting laser light, said method comprising:

producing a blank for a component of laser active quartz glass, said producing comprising:

a) providing a dispersion with a solids content of at least 40% by wt. which contains $SiO_2$ nanopowder and dopants, including a cation of one or more rare earth metals or transition metals in a liquid.

b) granulation by moving the dispersion with withdrawal of moisture until a doped $SiO_2$ granulate of spherical porous granulate grains having a moisture content of less than 35% by wt. and a density of at least 0.95 g/cm³ is formed, c) driving and purifying the $SiO_2$ granulate by heating said $SiO_2$ granulate to a temperature of at least 1000° C. so as to form doped porous $SiO_2$ granules having an OH content of less than 10 ppm, and d) sintering the doped $SiO_2$ granules in a reducing atmosphere so as to form the blank of doped quartz glass, wherein said sintering includes a gas pressure sintering, which comprises the following steps:

aa) heating the $SiO_2$ granules to a melting temperature of at least 1600° C. while applying and maintaining a negative pressure;

bb) holding the $SiO_2$ granules at the melting temperature at an overpressure ranging from 5 bar to 15 bar for a melting period of at least 30 min so as to form the quartz glass blank;

cc) cooling the quartz glass blank while maintaining said overpressure; and incorporating said blank into a cladding tube for a fiber; and transmitting said laser light through said fiber.

* * * * *